April 12, 1966     F. A. GRUETJEN     3,245,141
METHOD AND APPARATUS FOR MAKING CORED ARC ELECTRODES
Filed Oct. 12, 1962     3 Sheets-Sheet 1

INVENTOR.
FREDERICK A. GRUETJEN
BY
ATTORNEY

April 12, 1966  F. A. GRUETJEN  3,245,141
METHOD AND APPARATUS FOR MAKING CORED ARC ELECTRODES
Filed Oct. 12, 1962  3 Sheets-Sheet 2
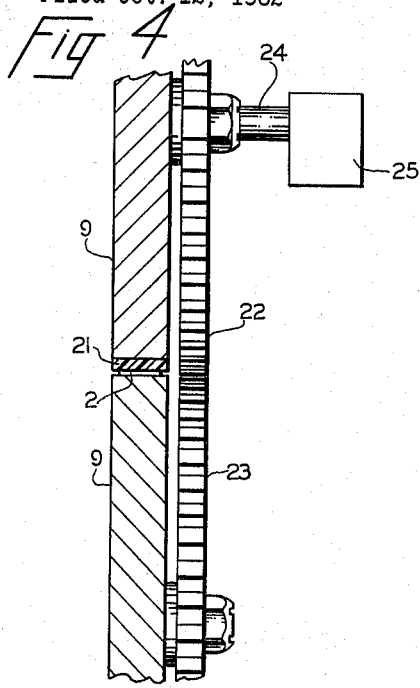
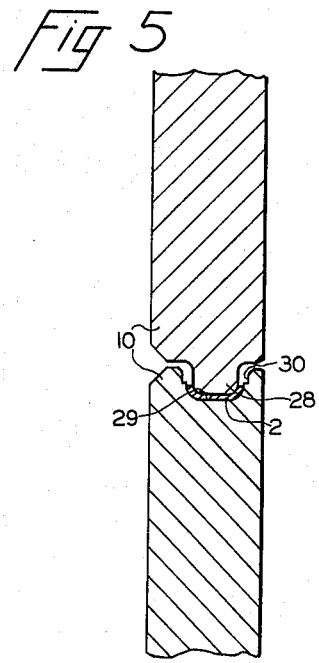
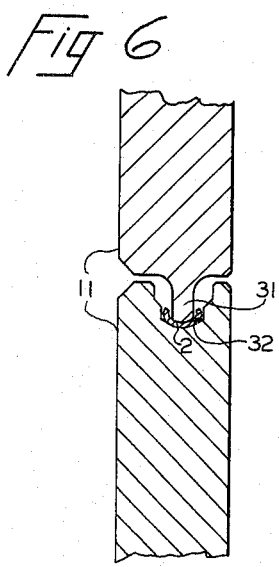
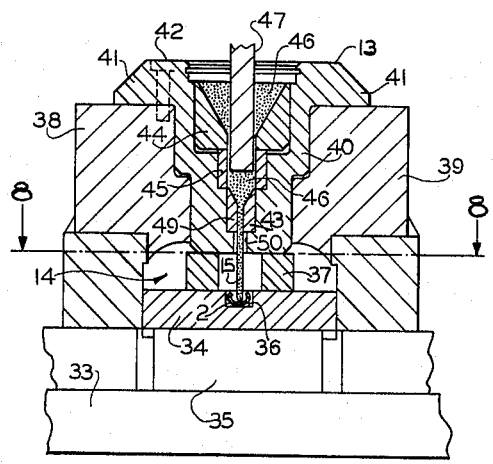
INVENTOR.
FREDERICK A. GRUETJEN
BY
Andrus + Starke
ATTORNEY April 12, 1966 F. A. GRUETJEN 3,245,141
METHOD AND APPARATUS FOR MAKING CORED ARC ELECTRODES
Filed Oct. 12, 1962 3 Sheets-Sheet 3
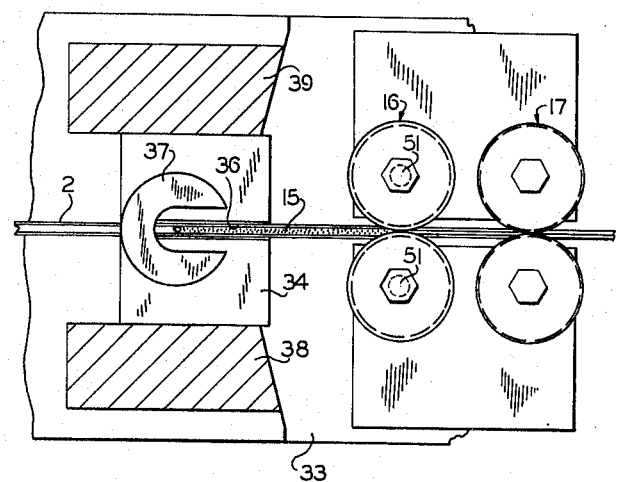
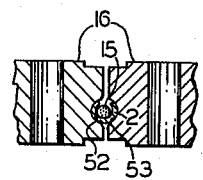
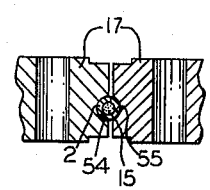
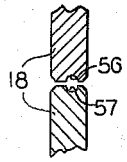
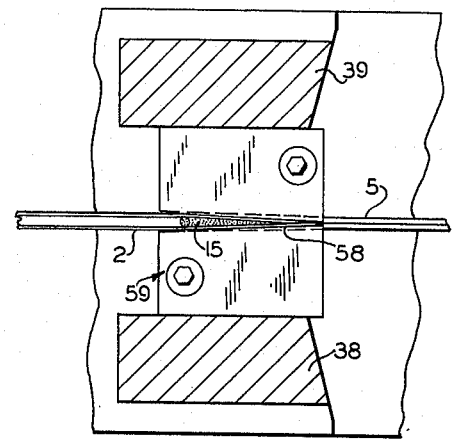
INVENTOR.
FREDERICK A. GRUETJEN
BY
ATTORNEY

United States Patent Office 3,245,141
Patented Apr. 12, 1966

3,245,141
METHOD AND APPARATUS FOR MAKING CORED ARC ELECTRODES
Frederick A. Gruetjen, Milwaukee, Wis., assignor, by mesne assignments, to Harnischfeger Corporation, West Milwaukee, Wis., a corporation of Wisconsin
Filed Oct. 12, 1962, Ser. No. 230,110
11 Claims. (Cl. 29—428)

This invention relates to a method and an apparatus for making cored arc electrodes and more particularly consumable electrodes having an outer metal sheath or shell forming the electrode proper and an inner arc controlling flux for arc welding processes and the like.

In welding and other arc processes wherein a consumable metal electrode is employed for either coating or joining of metal members and the like, a suitable stabilizing and arc modifying flux is often used to provide favorable arc characteristics and to protect the weld metal until it solidifies. Thus, it is well known to add a flux coating to the outer surface of the electrode or to introduce the flux as a separate medium simultaneously with the progress of the welding process. In addition, many suggestions have been made for employing a tubular electrode with a central core of suitable flux. For example, United States Patent 1,525,840 discloses a flux paste applied to a central core wire which is then enclosed within a suitable shell. More recently, United States Patent 2,000,182 disclosed a method of forming a cored wire whereby a strip is formed into a U-shaped member and filled with an appropriate flux and then closed to provide a generally tubular electrode having an inner flux core.

Nothwithstanding the developed state of the patent art, commercially available cored electrodes are relatively expensive because of manufacturing costs and have presented difficulty in close control of the flux properties therein. In prior art electrodes, the flux material is often consumed during the welding process at a greater or slower rate than the melting of the outer sheet; particularly in high speed welding processes. If the flux properties are not properly controlled, the flux may melt slower or faster than the metal sheath. Or, if the flux is not properly held within the electrode, it may fall therefrom.

The present invention is particularly directed to an improved method and apparatus for continuously and progressively forming a cored electrode from a flat strip of indefinite length. In accordance with the present invention, the strip is continuously and progressively formed into a partially closed strip shell. A flux paste is extruded as a solid continuous cylinder and progressively deposited in the partially closed shell as it is formed and immediately thereafter the shell is closed to form the electrode with an outer tubular sheath having an extruded core. The flux includes a binder and extrusion aid which permits high speed production and which serves to bind the core to adjacent inner surfaces of the electrode sheath or shell upon drying. The extruded core is a stable mass and may be extruded with a volumetrically controlled press to produce an endless core having a diameter substantially corresponding to that of the internal diameter of the finished electrode. The core may also be extruded with a pressure controlled press into a substantially closed tubular outer shell or sheath.

The stable extruded paste allows very close and accurate control of the chemistry of the core and thus the electrode is adapted to produce a very favorable and consistent arc action with the rate of flux disposition corresponding to the rate of melting of the outer electrode shell.

The cored electrode, in accordance with a further aspect of the invention, is manufactured by a continuous forming apparatus which includes a blank storage reel supporting a flat strip which is continuously fed through a preforming unit to a core extrusion press, through a strip closing means and finally wound on an electrode storage reel. The strip is positively fed into the preforming unit and the electrode storage reel is positively driven to wind up the electrode and maintain a slight predetermined tension on the electrode strip as it passes through the extrusion press and closing means.

Applicant has found that the present invention allows production of high quality cored electrodes at a very rapid rate and at a relatively low cost. The present invention thus provides an improved method and apparatus for the manufacture of cored electrodes for arc establishing purposes.

The drawings furnished herewith illustrate the best mode presently contemplated for carrying out the invention.

FIG. 4 is an enlarged fragmentary view taken on line 4—4 of FIG. 2 and showing a strip feed portion of the forming apparatus;

FIG. 5 is a fragmentary vertical section taken on line 5—5 of FIG. 2 and showing the cross-section of a pair of forming rolls;

FIG. 6 is a view taken on line 6—6 of FIG. 2 and shows a portion of a set of second forming rolls;

FIG. 7 is a view taken on line 7—7 of FIG. 2 through the extrusion press shown in FIGS. 1 and 2;

FIG. 8 is a horizontal section taken on line 8—8 of FIG. 7;

FIG. 9 is a vertical section taken on line 9—9 of FIG. 2 and showing a pair of closing rolls shown in FIGS. 1 and 2;

FIG. 10 is a view similar to FIG. 9 and taken on line 10—10 of FIG. 2 showing the final closing rolls;

FIG. 11 is a fragmentary vertical section taken on line 11—11 of FIG. 2 of a pair of pinching rolls; and FIG. 12 is an enlarged vertical section showing an alternative means for closing a partially closed tube having a flux core disposed therein.

Figure 1:
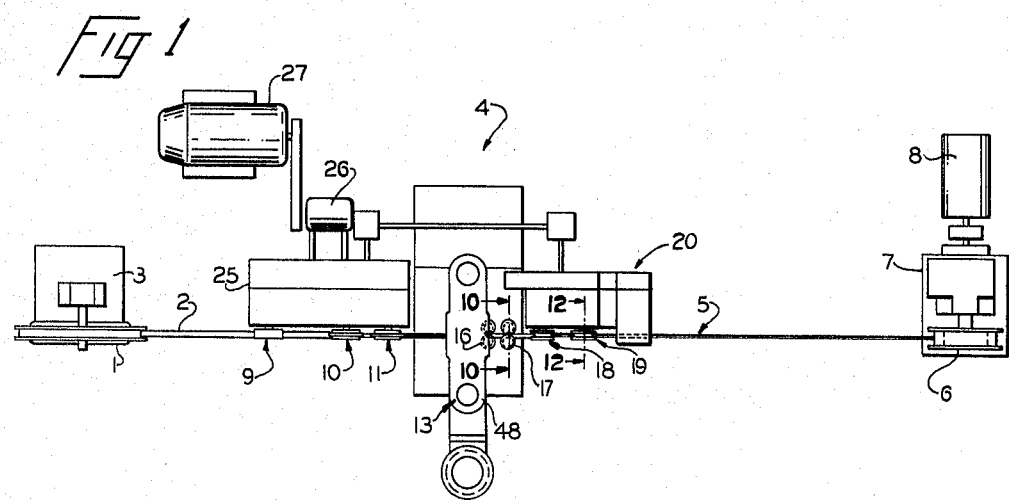
FIG. 1 is a plan view of a cored wire electrode forming apparatus constructed in accordance with this invention.
Figure 2:
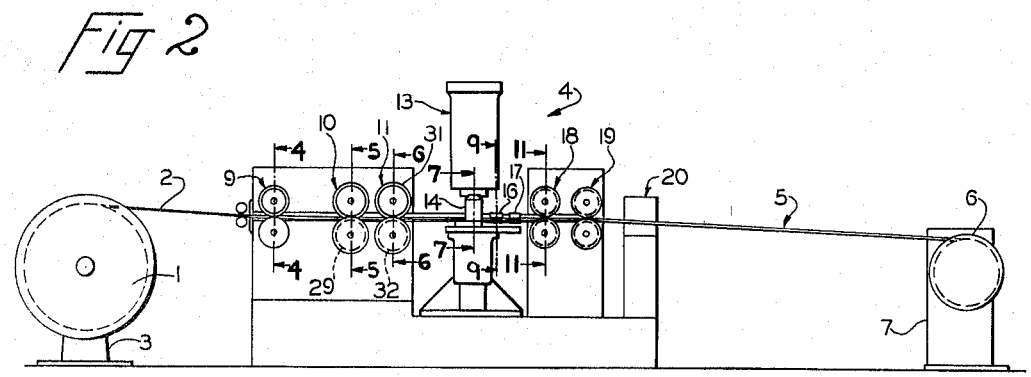
FIG. 2 is a side view of the apparatus shown in FIG. 1.

Referring to the drawings and particularly to FIGS. 1 and 2, an apparatus for manufacturing cored electrodes of indefinite length is shown including a supply reel 1 on which is wound a metal strip 2 from which the outer shell of an electrode is to be formed. The reel 1 is rotatably mounted on a suitable support 3 to allow unwinding of the strip 2 from the reel 1 for continuous passing through a forming and extruding unit 4. The strip 2 is formed of a width generally corresponding to the final circumferential length of the electrode and in passing through the unit 4 is formed into a tubular cored electrode 5. The formed electrode 5 is continuously coiled onto a final storage reel 6 which is rotatably supported in a suitable support 7. A hydraulic motor 8, preferably of a constant torque type, is coupled to continuously rotate the reel 6 for winding of the electrode 5 thereon and to maintain the electrode 5 under tension.

Figure 3:
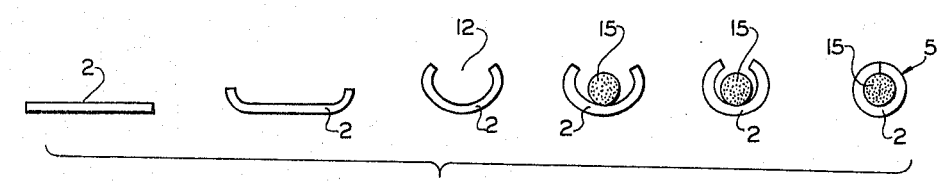
FIG. 3 is a diagrammatic view showing the sequence of forming operations of the apparatus shown in FIGS. 1 and 2.

Referring particularly to FIG. 3, the progressive changes in the configuration of the strip 2 as it passes through unit 4 is illustrated beginning with the flat strip 2 and ending with the closed tubular electrode 5. On the incoming side of the unit 4, a pair of feed rolls 9 frictionally grip the flat strip 1 and in cooperation with the pull exerted by the hydraulic motor 8 on reel 6 unwind the strip from the reel 1 and feeds it into a first pair of forming rolls 10 of unit 4.

The pair of forming rolls 10 bend the edges of strip 2 upwardly to form an upwardly opening dished strip, as shown as the second formation in FIG. 3. A second pair of forming rolls 11 form the strip 2 from rolls 10 to take on a more circular configuration with the opposite edges spaced to define a channel-shaped strip having a core receiving opening 12. The partially open strip 2 passes through an extrusion press 13 having a stirp filling assembly 14 which deposits a continuously extruded core 15 into the partially open strip. The strip 2 and core 15 then passes through sequentially arranged pairs of closing rolls 16 and 17 which close the channel-shaped strip with the opposing edges of strip 2 abutting. Pairs of pinch rolls 18 and 19 are provided immediately adjacent the discharge side of the final closed rolls 17 to effect a very tight abutting of the opposite edges of the strip 2, as shown in FIG. 3.

In the illustrated embodiment of the invention, a welding unit 20 is diagrammatically shown for effecting a suitable welding of the abutting edges to insure a positive hermetic seal of the tubular strip. The welding unit 20 may be of any suitable variety such as a conventional high frequency resistance welding unit and no further description thereof is given. Generally, the pinch rolls 18 and 19 will insure a very tight closing of the outer shell and the welding unit 20 can be eliminated. The welding unit 20 has been shown however as a possible further additional step which can be directly incorporated for forming electrodes in which the hygroscopic properties of the flux demand that all opportunity for moisture absorption be eliminated. For example, low hydrogen fluxes or coating have hygroscopic properties which conventionally require storage under controlled humidity and temperature to prevent moisture absorption.

Referring particularly to FIG. 4, a fragmentary vertical section of feed rolls 9 is shown. The feed rolls 9 are rotatably mounted in stacked vertical relationship with the strip 2 passing between the peripheral edges. The lower roll 9 is a smooth steel member and the upper feed roll 9 is provided with a friction drive surface 21 of rubber or the like to grasp the strip 2. A pair of drive gears 22 and 23 is coupled one each to the feed rolls 9 to the output of a suitable hydraulic motor. A shaft 24 upon which gear 22 and the corresponding forming roll 9 is mounted is positively driven through a drive coupling unit 25 and a clutch 26 by a suitable motor 27, shown in FIG. 1.

The motor 27 is a preferably hydraulic, constant-torque unit which is adapted to rotate the feed rolls 9 at a constant speed somewhat less than that of reel 6 for a smooth and continuous withdrawal of the strip 2 from the reel 1 in cooperation with the pulling action effected on the tubular cored strip or electrode 5 by the reel 6.

A fragmentary vertical section through the first forming rolls 10 is shown in FIG. 5. The rolls 10 are rotatably mounted in stacked aligned relation for gripping and forming of the strip 2. The forming rolls 10 are rotatably mounted and driven by motor 27 in the same manner as the pair of feeding rolls 9. The upper forming roll 10 includes a peripheral projection 28 which generally conforms to but is slightly less in width than a matching groove or cavity 29 in the periphery of the bottom forming roll 10. The projection 28 mates with the groove 29 and is spaced therefrom in accordance with the thickness of the strip 2. As the strip 2 passes therebetween, the outer edges are turned upwardly and form the dish-shaped configuration shown in FIG. 3. The outer edges of the groove 29 are enlarged as at 30 to prevent binding of the strip.

The partially formed strip 2 moves from the pair of forming rolls 10 to the second forming rolls 11 which are generally arranged and driven in accordance with the previous description of the pair of forming rolls 10. The upper roll 11 however includes a relatively narrow peripheral projection 31 mating with a similarly shaped peripheral groove 32 in the lower roll 11. The projection 31 is spaced from the surface of the groove 32 generally in accordance with the thickness of the metal strip 2. The forming rolls 11 progressively change the strip 2 into a generally U-shaped channel member having the opening 12, shown in FIG. 3, prior to entering the strip filling assembly 14 of the extrusion press 13.

Referring to the drawings and particularly to FIGS. 7 and 8, the extrusion press 13 includes a support bed 33 to which the strip filling assembly 14 is secured. Assembly 14 includes a strip guide 34 secured to a spacer plate 35 on the bed 33. The upper surface of the guide 34 includes a longitudinal groove or slot 36 which is aligned directly with the incoming path of the strip 2 for guiding thereof beneath the extrusion press 13 which is spaced therefrom by a U-shaped spacer 37.

Side stepped frames 38 and 39 are secured to the bed 33 and extend upwardly in supporting connection with press 13. The side edges of the guide 34 engage the adjacent side frames 38 and 39 and are laterally supported thereby. An extrusion nozzle holder 40 is secured to the upper end of the side frames 38 and 39 and projects inwardly toward the guide 34.

The upper end of nozzle holder 40 includes an encircling flange 41 which bears on the side frames 38 and 39. Bolts 42 extend through appropriate openings in the flange 41 and thread into correspondingly tapped openings in the frames 38 and 39 to rigidly lock the nozzle holder 41 to the frames. The lower end of nozzle holder 40 rests on the U-shaped spacer 37 and rigidly clamps the guide 34 beneath the extrusion press 13.

The nozzle holder 40 includes a central stepped opening with a nozzle 43 disposed within the lower end thereof. A pair of cavity forming members 44 and 45 are disposed within the nozzle opening and define a funnel-shaped cavity through which a suitable core material 46 is forced under suitable pressure into the nozzle 43 by a piston 47 which is coupled to a suitable hydraulic actuator 48.

The nozzle 43 includes a funnel-shaped opening having a final nozzle opening 49 with a diameter essentially corresponding to the diameter of the final extruded core 15. The core material 46 is forced downwardly through the nozzle opening 49 and then through a somewhat larger opening 50 in the lower end of the nozzle holder 40. The extruded core 15 is a solid continuous cylinder which extends downwardly from the holder 40 and through spacer 37 into the channel-shaped strip 2.

The spacer 37 defines a passage opening in the direction the strip 2 moves through the extrusion press for depositing of core 15 within strip 2.

The core material may be any suitable welding flux which can be formed into a stable flux paste and extruded as a continuous solid core to avoid voids wtihin the core member after closing of the tube around the core. For example, the flux may be one of the low hydrogen fluxes presently applied to the exterior of core wire. The flux paste is preferably a wet mixture including a binding material such that when the strip 2 is collapsed about the core 15, the solid mass tightly adheres to the inside of the tubular strip. The paste may include any mixture of flux and additives of alloys and the like which is thoroughly premixed to distribute the additive through the flux. The additive is held properly distributed by the stable flux material. This is desirable to maintain a proper uniform arc characteristic and weld metal protection.

Applicant has found that a flux which includes a binder comprising 8 parts medium density potassium silicate plus 12 parts water and 3 parts of Kelcosol provides a very suitable core which is readily extruded and provides good arc characteristics without pitting or the like. The Kelcosol should be kept as low as practical however to maintain optimum extrusion of the flux.

The extrusion press 13 is preferably of the volumetric control type to closely regulate the extrusion of core 15 in accordance with the speed of strip 2. The amount of flux per unit length can then be very closely controlled and a predetermined flux to metal ratio also maintained. The resulting electrodes will then produce uniform high quality welds.

As the volumetric extrusion produces accurate flux to metal ratio, the strip 2 can be closed to a tubular member with the opposite edges in engagement. In FIGS. 1 and 2, successive pairs of closing rolls 16 and 17 are provided on the discharge side of extrusion press 13.

The core material 46 may be somewhat abrasive and tend to wear the walls of nozzle 43. For high quality electrodes the nozzle 43 may therefore have to be periodically replaced. To replace the nozzle 43, piston 46 is retracted and the members 44 and 45 are removed from holder 40. In order to maintain accurate volumetric extrusion for reasonable nozzle life, the nozzle 43 is preferably formed of a tungsten carbide or other tool steel which has been suitably heat treated to prevent rapid erosion of the nozzle 43 to reduce the frequency of nozzle replacement.

Referring particularly to FIGS. 1, 2, 8 and 9, the first pair of closing rolls 16 is rotatably mounted on a pair of vertical shafts 51 on opposite sides of the path of the channel-shaped strip 2 with a small clearance between the peripheries of the rolls. The closing rolls 16 rotate freely on the corresponding shaft 51 as the strip 2 is forced therebetween by the action of feed rolls 9 and the winding of the electrode on reel 6. The closing rolls 16 include corresponding peripheral grooves 52 and 53. Each groove 52 and 53 has a circular base portion with the radius lying within the corresponding groove and outwardly flared side edges. The closing rolls 16 engage the opposite sides of the core-filled channel-shaped strip 2 and force them toward each other to further collapse the strip about the core 15, as shown in FIG. 3.

Referring to FIG. 10, the final closing rolls 17 are mounted in accordance with rolls 16 and include complementing peripheral grooves 54 and 55 arranged to engage the sides of the partially closed strip 2. Each of the grooves 54 and 55 however is a generally semicircular configuration corresponding to the outer final diameter of the cored electrode 5. The final closing rolls 16 complete the tubular forming of the strip 2 and force the opposite edges of the strip 2 into abutting engagement and thereby form a closed tube.

To complete the forming of the continuous electrode, the closed tubular strip 2 is passed between similar pairs of pinch rolls 18 and 19, a fragmentary portion of rolls 18 being shown in section in FIG. 11.

The rolls 18 are vertically stacked and mounted for rotation on horizontal axes with the plane of the rolls 18 coinciding with a radial or vertical plane through the abutting edges of the closed strip 2. The rolls 18 include complementing peripheral grooves 56 and 57 corresponding to the final diameter of the electrode 5. Rolls 18 exert a closing force perpendicular to that of closing rolls 16 and 17 and insure a tight mechanical seal of the abutting edges of strip 2 and a cylindrical configuration of the final electrode.

The welding unit 20 may be operated to butt weld the abutting edges of strip 2 and hermetically seal the core 15 within the outer metallic sheath.

The electrode is then wound on the positively rotated storage reel 6 for storage or further processing and subsequent application in welding or other arc processes.

In summary, the illustrated embodiment of the invention functions as follows:

The extrusion press 13 is filled with a predetermined flux paste material 46. The strip reel 1 is mounted in the support 3 and the strip 2 is unwound from the reel 1 and fed through the feed rolls 9. The hydraulic motors 8 and 27 are operated to feed the strip 2 through the forming and extruding unit 4. Motor 8 drives the reel 6 at a slightly greater speed than the rolls 9–11, inclusive, which are driven by motor 27 to maintain tension on the strip 2 as it passes through unit 4. The apparatus thereafter automatically feeds and forms the strip 2 through the extrusion press 13. The core material 46 is deposited within the partially formed strip 2 in accordance with one embodiment in a closely regulated amount as a continuous solid core 15 and at a rate corresponding to the movement of the strip 2 through the press 13. The pairs of closing rolls 16 and 17 close the strip 2 about the preformed extruded core 46 and the closure is finally set by the pairs of pinch rolls 18 and 19.

In some applications, the edges may be butt welded by unit 20 to insure a hermetic seal of core 15 within the outer sheath.

The entire process is continuous with the flux cored electrode spooled directly onto the final storage reel 6 ready for baking, other processing or use as desired.

Where strip 2 is formed of a metal which is relatively hard to form, it may be advisable to lubricate the strip 2 to assist in the forming operation. For example, just prior to entry into the feed roll 9 or immediately thereafter, a suitable wax may be wiped across the undersurface of the strip 2 in any suitable manner, not shown.

If a controlled volumetric extrusion is not desired, a closing die 58, such as shown in FIG. 12, may be formed within the outer portion of a guide 59 through which strip 2 passes to receive the core 15 and the closing rolls eliminated. The closing die 58 is of any suitable construction and effects an essential complete seal of the strip 2 at or closely adjacent the extrusion point. The closing die 58 permits variations in the pressure of the flux core 15 to maintain complete filling of the hollow tubular strip therewith. Thus, it is merely necessary to maintain an adequate extrusion pressure to force the core material into the outer shell or sheath formed by the strip 2 and thereby maintain a complete fill of the cored electrode.

Generally, the present process is adapted to extrude at a rate in excess of 1000 feet per minute although the invention can be employed with substantially slower rates if desired. The flux to metal ratio can be varied by varying the nozzle opening 50 or by varying the thickness of the metal strip 2.

The present invention allows rapid manufacture of cored electrodes while maintaining highly accurate control of the chemistry of the flux. The flux is permanently attached to the inside of the tubular wire through the use of an extruded paste as the flux. As a result the flux material will not fall from the tubular wire during the welding process as often happens in prior art devices but is deposited in precise relation to the melting of the electrode.

Generally, the electrode wire should be baked after the final formation in order to improve the hygroscopic tendency. Baking temperatures must not adversely affect the character of the electrode metal however. Applicant has found that the flux formation is the most significant factor however and if the chemistry of the flux mixture is accurately controlled, high quality welds will be obtained with somewhat less consideration being necessary to the moisture content.

Maintaining of the nozzle size is of substantial importance in the volumetric control system heretofore described to properly maintain the predetermined flux to wire ratio.

The present invention thus provides a means for continuously and rapidly forming a flux filled electrode in which the chemistry of the flux is accurately controlled and the ratio of the flux to the metal of the electrode is maintained at a predetermined ratio. An important advantage of the present invention is the adhering of the flux core to the electrode to maintain precise depositing of the flux and the electrode metal.

Various modes of carrying out the invention are contemplated as being within the scope of the following claims particularly pointing out and distinctly claiming the subject matter which is regarded as the invention.

I claim:

1. The method of forming a consumable cored electrode having an outer metal sheath and a cylindrical flux core, which comprises
   (a) continuously and progressively forming a flat strip of the metal of said metal sheath into a channel-shaped member having an opening slightly greater than the diameter of the core,
   (b) progressively extruding a solid continuous flux cylinder having a diameter corresponding to the flux core into said channel-shaped member immediately after the forming thereof to form an inner flux core, and
   (c) progressively closing said channel-shaped member with the opposite edges thereof engaging each other immediately after the extrusion of said flux core into the corresponding portion of the member.

2. The method of forming a consumable cored welding electrode having an outer tubular metal electrode sheath and an inner flux core adhering thereto, which comprises
   (a) continuously and progressively deforming a flat strip of said tubular metal having a width corresponding to the circumferential length of said sheath into a channel-shaped portion having an opening slightly greater than the diameter of said flux core,
   (b) continuously and progressively extruding a flux paste in the form of a solid continuous cylinder of a diameter corresponding to the diameter of the core into said channel-shaped portion and into timed relation with the forming of said channel-shaped portion, said flux paste including a binder adapted to adhere to the metal sheath, and
   (c) closing said channel-shaped portion about said cylinder with the opposite edges of said strip in abutting engagement to form said electrode.

3. Apparatus for continuously forming a tubular electrode from an electrode metal strip of a width corresponding to the circumferential length of the electrode and having an inner flux core completely filling the tubular electrode, which apparatus comprises
   (a) forming means adapted to continuously and progressively deform said strip in an upwardly opening channel-shaped cross-section,
   (b) an extrusion unit adapted to extrude a flux paste as a solid continuous cylinder having a diameter corresponding to the inner flux core,
   (c) guide means to guide the channel-shaped strip through the extrusion unit and to progressively deposit said cylinder into the strip,
   (d) closing means adapted to engage the exterior of said channel-shaped strip to close said strip into a tubular cross-section with the opposite edges in abutting relation, and
   (e) feed means adapted to grasp the strip for feeding through said forming means and said extrusion unit and said closing means.

4. The apparatus of claim 3 wherein,
   (a) said closing means includes a closing die located immediately adjacent the extrusion point of said guide and constructed to completely close the channel-shaped strip into a tubular member and permitting variation in the extruding pressure to establish a complete filling of the tubular member.

5. The apparatus of claim 3 having
   (a) a welding means mounted on the outlet side of the closing means and progressively welding the abutting edges of the strip to hermetically seal the joint therebetween.

6. Apparatus for continuously forming a tubular electrode from an electrode metal strip of a width corresponding to the circumferential length of the electrode and having an inner flux core completely filling the tubular electrode, which comprises
   (a) forming means adapted to continuously and progressively deform said strip in an upwardly opening channel-shaped cross-section,
   (b) an extrusion press having a volumetric control and adapted to extrude a flux paste as a solid continuous cylinder corresponding in diameter to said flux core and having means to guide the channel-shaped strip therethrough to progressively receive said cylinder,
   (c) closing means adapted to engage the exterior of said channel-shaped strip to close said strip into a tubular cross-section with the opposite edges in abutting relation,
   (d) feed means adapted to grasp the strip for feeding into said forming means, and
   (e) feed means adapted to grasp the closed filled strip and to pull on the strip to maintain a predetermined tension thereon through said extrusion press and closing means.

7. The apparatus of claim 6 wherein said last-named feed means comprises,
   (a) a storage reel adapted to have said electrode wound thereon, and
   (b) means to rotate said reel to wind the closed strip thereon and to establish said predetermined tension.

8. Apparatus for manufacture of a tubular electrode of a consumable metal from a flat strip wound on a reel and having a width corresponding to the circumferential length of the electrode and having a flux core completely filling the electrode, which comprises
   (a) successive forming roll units having pairs of vertically stacked forming rolls adapted to have said strip fed therethrough and successively formed into a channel-shaped portion,
   (b) a supply reel support means adapted to rotatably support the supply reel,
   (c) feed roll means interposed between said supply reel means and said forming roll units and adapted to grip the opposite faces of the strip to feed the strip into the forming roll units,
   (d) means to drive said feed roll means and said forming roll units at a constant and corresponding speed,
   (e) an extrusion press having a nozzle opening essentially corresponding to the diameter of the flux core and having volumetric control means for regulating the rate of extrusion,
   (f) an upwardly opening channel member aligned with the last of said forming rolls to receive and guide the channel-shaped portion of the strip beneath and in spaced alignment with said nozzle opening,
   (g) closing roll means having at least one pair of horizontally spaced closing rolls adapted to have said channel-shaped portion passed therethrough and progressively closing the same to cause the opposite edges of the strip to abut,
   (h) a coiling mechanism adapted to have the closed strip secured thereto,
   (i) means to drive said coiling mechanism at a speed to exert a pull on said strip to maintain a predetermined tension thereon, and
   (j) means to regulate the relative movement of said strip through said extrusion press and the extrusion rate of said extrusion press to deposit a flux core in accordance with a predetermined cross-sectional ratio of flux core to metal.

9. The apparatus of claim 8 having
   (a) a welding means mounted between the closing roll units and the coiling mechanism and adapted to have the closed strip passed therethrough and progressively weld the abutting edges of the strip to hermetically seal the joint therebetween.

10. The apparatus of claim 8 having
   (a) at least one pair of vertically spaced pinching rolls mounted to receive the strip as it leaves the closing roll means and engaging said strip with the plane of rolls coinciding with a radial plane through the abutting edges.

11. Apparatus for manufacture of a tubular electrode of a consumable metal filled with a welding flux from a flat strip having a width corresponding to the circumferential length of the electrode, said strip being carried by a supply reel and said tubular electrode being wound on a storage reel, which apparatus comprises (a) a supply reel support means adapted to rotatably support the supply reel, (b) successive pairs of forming rolls adapted to have said strip fed therethrough, each of said pairs of forming rolls having a mating projection and groove for successively forming the strip into a channel-shaped portion, (c) feed rolls interposed between said supply reel means and said pairs of forming rolls and adapted to grip the opposite faces of the strip to feed the strip into the forming rolls, (d) means to drive said feed rolls and said forming rolls at a constant and corresponding speed, (e) an extrusion press having a nozzle opening with a diameter corresponding to the diameter of the flux core and having volumetric control means for regulating the rate of extrusion, (f) an upward opening channel guide aligned with the last of said forming rolls to receive and guide the channel-shaped strip beneath and in vertically spaced alignment with said nozzle opening, (g) pairs of closing rolls with each pair being horizontally spaced and having complementing peripheral grooves to engage the sides of said channel-shaped strip and progressively close the same with the opposite edges of the strip abutting each other, (h) a storage reel support means adapted to rotatably support a storage reel, (i) means adapted to be coupled to a storage means on said storage reel support means and adapted to rotate the reel at a speed greater than the speed of said forming rolls and said feed rolls to exert a pull thereon and maintain a predetermined tension on said strip, and (j) means to regulate the relative movement of said strip through said extrusion press and the extrusion rate of said extrusion press to deposit a flux core in accordance with a predetermined cross-sectional ratio of flux core to metal.

References Cited by the Examiner
UNITED STATES PATENTS

| | | |
|---|---|---|
| 1,531,828 | 3/1925 | Armor. |
| 1,629,748 | 5/1927 | Stoody. |
| 2,417,594 | 3/1947 | Fleche. |
| 2,442,087 | 5/1948 | Kennedy _____ 219—146 |

FOREIGN PATENTS

| | | |
|---|---|---|
| 519,435 | 2/1931 | Germany. |

JOHN F. CAMPBELL, *Primary Examiner.*